United States Patent

[11] 3,614,456

[72] Inventor Hansjoachim Hamisch
Berlin, Germany
[21] Appl. No. 799,823
[22] Filed Feb. 17, 1969
[45] Patented Oct. 19, 1971
[73] Assignee Robert Bosch GmbH
Stuttgart, Germany
[32] Priority Feb. 17, 1968
[33] Germany
[31] P 16 13 987.0

[54] APPARATUS FOR MAINTAINING A RECORDING RADIATION SPOT ON A RECORD CARRIER
15 Claims, 3 Drawing Figs.

[52] U.S. Cl. ...................................... 250/234,
250/216, 250/219 F, 356/123, 356/125
[51] Int. Cl. ...................................... H01j 3/14
[50] Field of Search ........................................... 250/201,
216, 204, 234; 350/180; 353/140, 101; 356/123, 125; 95/44 R, 44 C, 45 R

[56] References Cited
UNITED STATES PATENTS

| | | | |
|---|---|---|---|
| 2,897,722 | 8/1959 | Gunter, Jr. et al. | 356/126 |
| 3,037,423 | 5/1962 | Shurcliff | 352/140 X |
| 3,161,718 | 12/1964 | De Luca | 350/180 |
| 3,418,477 | 12/1968 | Knutrud et al. | 250/201 |
| 3,506,839 | 4/1970 | Ando et al. | 250/222 |
| 3,519,830 | 6/1970 | Kamentsky | 250/217 |

FOREIGN PATENTS

| | | | |
|---|---|---|---|
| 258,604 | 3/1967 | Austria | 352/140 |
| 1,103,050 | 4/1958 | Germany | 250/201 |

Primary Examiner—James W. Lawrence
Assistant Examiner—D. C. Nelms
Attorney—Michael S. Striker ABSTRACT: A laser beam is focused by a lens on a moving record carrier for forming a record. Transverse displacements of the record carrier relative to the lens, are compensated by a control voltage produced by a photocell receiving varying amounts of reflected light through a diaphragm.

INVENTOR
Hansjoachim HAMISCH
By his ATTORNEY

INVENTOR
Hansjoachim HAMISCH

APPARATUS FOR MAINTAINING A RECORDING RADIATION SPOT ON A RECORD CARRIER

BACKGROUND OF THE INVENTION

It is known to obtain a physical effect on a surface by a focused laser beam. For example, recordings can be burnt into a surface coating on a record carrier. However, the surface on which the laser beam is focused, may change its position and distance from the focusing lens due to disturbing influences, such as temperature fluctuations, shocks, or vibrations. It is desirable to maintain the focus of the recording lens under all circumstances on the surface of the record carrier so that a metallic coating on the record carrier is reliably vaporized by the spot formed on the record carrier by the focused light of the laser beam.

Apparatus serving this purpose is known, and in one construction according to the prior art, the displacement of the focal spot is measured by means of photocells on which the diffused reflecting focal spot is imaged by means of a second lens. The output voltage of the photocells produces an error-indicating signal for a control system which holds the focusing lens at a fixed distance from the surface of the record carrier. Two photocells of 0.5 mm.$^2$ area are used and lateral photocells for indicating greater deviations of the record carrier from the normal position. The apparatus operates with an accuracy of a few hundred millimeters.

In another apparatus according to the prior art, main light and reflected light pass through the same lens system, and a semitransparent mirror is provided in the path of the rays which produces a beam focused by means of a lens on a photocell having a diaphragm with an opening. The diaphragm is secured to a tuning fork which effects a sensing movement of the diaphragm opening along the optical axis. Due to the oscillation at a frequency of a few hundredths Hertz, the light impinging the photocell is modulated. The sinusoidal output voltage serves as an error-indicating signal for a servosystem adjusting the position. By comparison of the phases of the output voltage of the photocell and the operating voltage of the mechanical oscillatory system, the direction and magnitude of the displacement of the recording lens in relation to the recording surface is determined.

The first-mentioned construction according to the prior art has the disadvantage that its accuracy is low due to the fact that the focal spot of laser beams may have a magnitude of a few wavelengths of light so that a substantial variation of the energy density occurs at displacements of the order of magnitude of the focal spot. The other apparatus of the prior art operates at a higher accuracy, but is unsuitable for regulating very rapid disturbances occurring within fractions of milliseconds since the regulating speed cannot be faster than can be obtained during one oscillation of the mechanical oscillatory system.

SUMMARY OF THE INVENTION

It is one object of the invention to overcome the disadvantages of the prior art, and to provide an apparatus for maintaining a recording radiation spot on a record carrier, which operates at great accuracy at a very high speed.

Another object of the invention is to provide an electrical control system for maintaining a recording radiation spot on a record carrier.

Another object of the invention is to maintain the focal point of a lens on a displaceable surface by interposing a lens of variable power of refraction in the path of radiation to the lens.

Another object of the invention is to maintain the same distance between a focusing lens and a surface by a control system responding to light reflected from the surface through a diaphragm opening into a photocell.

Another object of the invention is to provide a lens whose power of refraction and focal length can be adjusted under the control of a varying voltage.

With these objects in view, the present invention mainly concerns an apparatus for stabilizing the position of the focal spot of an optical lens system, particularly in a recording device in which a beam of radiation focused on a moving record carrier produces a recorded track on the same. The apparatus according to one embodiment comprises a radiation divider, such as a partly transparent mirror, adjusting means for influencing the distance of the focus from the record carrier under the control of electric signals, a photocell, a diaphragm, and a control lens in the control beam. The radiation divider is arranged so that a part of the light reflected by the record carrier through the recording lens is projected into the photocell through the control lens and the diaphragm opening. In accordance with the position of the focal spot of the recording lens relative to the record carrier, the diaphragm opening permits a variable part of the control beam to reach the photocell which produces a corresponding varying output voltage controlling the adjusting means by which the relative position of the focal point and the displaced record carrier is adjusted so that the focal spot of the recording lens remains located on the record carrier irrespective of displacements of the same.

In the preferred embodiment of the invention, another radiation divider is provided in the path of the control beam and projects part of the same into another photocell whose output voltage serves as a reference voltage for the variable output voltage of the first-mentioned photocell so that fluctuations of the intensity of the reflected light due to changes of the reflection properties of the record carrier and fluctuations of the intensity of the source of light are compensated.

The invention has the advantage that the position of the recording focal spot in relation to the surface of the record carrier can be adjusted to a constant value within a very short regulating time and with very great accuracy. If the second photocell and radiation divider described above are also used, the influence of fluctuations of the intensity of the recording main beam of radiation can be compensated.

An apparatus of the invention comprises means for projecting a main beam of radiation, such as a laser; first recording lens means for projecting the radiation of the main beam at a focal point located in a first focal plane; a record carrier located in the focal plane movable in the same so that the radiation is focused at said focal point as a spot forming a recording on the record carrier; control means including a radiation divider located in the main beam and forming a control beam of radiation reflected from the focal spot on the record carrier, a second lens means located in the control beam forming a focal image of the reflected spot in a second focal plane, a diaphragm in the control beam having an aperture, and a photocell receiving from the focal image through said aperture an amount of radiation depending on the relative position of the focal image and the aperture, and varying due to displacement of the record carrier out of the first focal plane so that the photocell produces a variable output voltage; and adjusting means controlled by the variable output voltage for adjusting the relative position of the focal point of the recording lens and of the record carrier so that the focal point remains located on the record carrier irrespective of transverse displacements of same which may be due to vibration or shock.

In the preferred embodiment of the invention, the adjusting means comprise a variable control lens located in the main beam of radiation. The refractive power of the control lens is adjustable, by means which are responsive to the variable output voltage of the photocell in the control beam. Whenever the record carrier is displaced out of its normal recording position, the output voltage of the photocell is varied, and causes an adjustment of the control lens by which the focal spot of the recording lens is again placed accurately on the record carrier.

It is also possible to provide electromechanical means controlled by the output voltage of the photocell for adjusting the position of the support of the record carrier under the control of the output voltage of the photocell in such a manner that the record carrier is again placed in the focal plane of the recording lens after each undesired displacement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
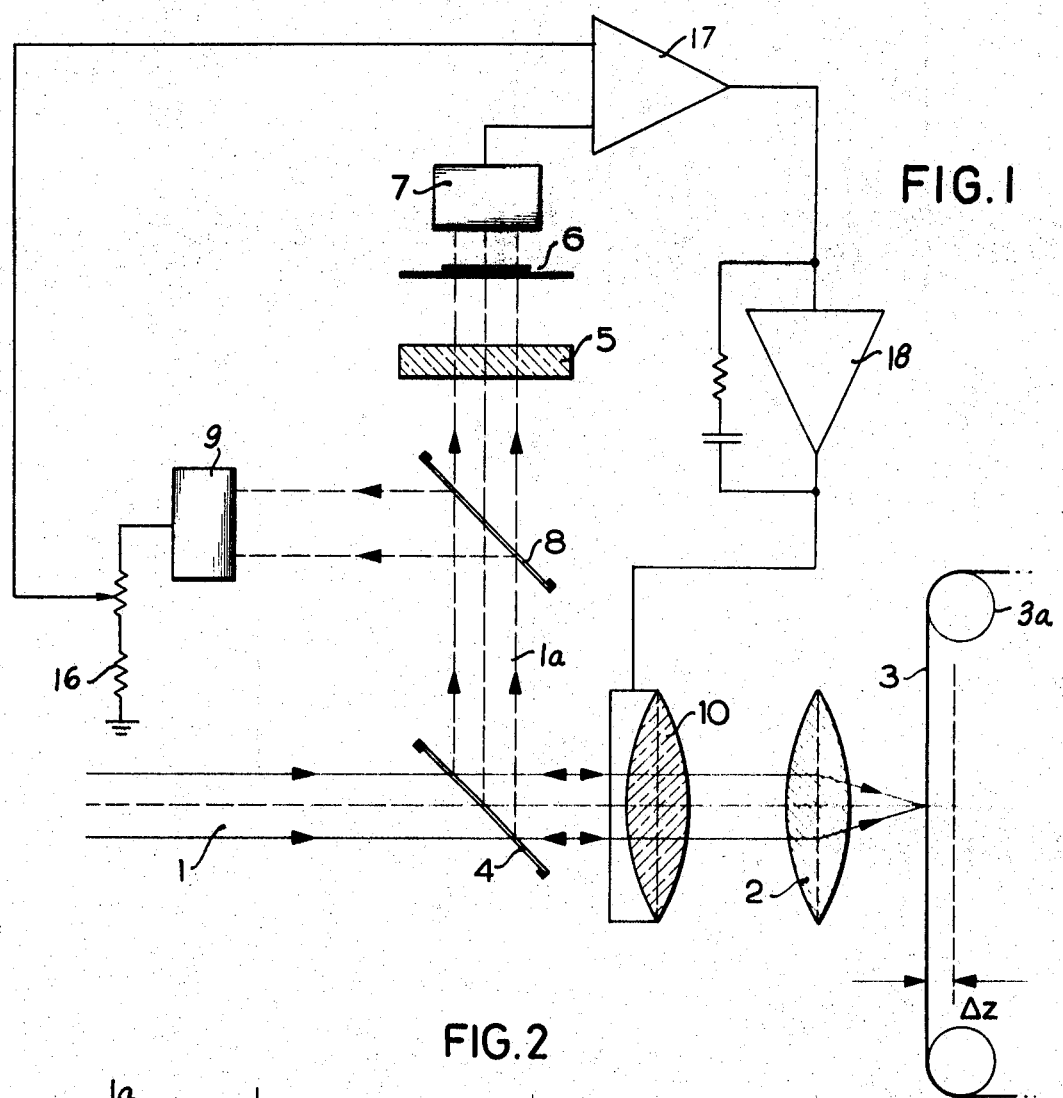
FIG. 1 is a schematic and partly diagrammatic view illustrating a preferred embodiment of the invention.

Referring first to FIG. 1, a laser, now shown, produces a beam of light 1 of low divergence which is focused by a recording lens 2 onto the surface of a record carrier 3 which is transported by support rollers 3a. Record carrier 3 is preferably a tape consisting of a synthetic material and is provided with a metallic coating produced by vaporization. Where the focal spot of recording lens 2 is located on the coating, the same is burned off so that a transparent recorded track is produced. The movement of record carrier 3 may be stepwise so that the track is formed by a number of successive burned off points which represent a signal. Due to variations of the thickness of the record carrier tape, further due to mechanical shocks and temperature variations, the surface of the record carrier tape may be displaced out of the focal plane of recording lens 2 so that the energy density of the focal spot of the laser beam is reduced, and the metallic coating is not burned off, or only partly burned off so that a wrong recording is produced on the record carrier.

In accordance with the invention, a radiation divider in the form of a semitransparent mirror 4 is provided in the beam 1 which is impinged by light reflected from the focal spot on record carrier 3 and projects part of the reflected light transversely in the form of a control beam 1a.

Control beam 1a passes through another semitransparent mirror 8, a cylinder lens 5, a diaphragm 6 having a slot-shaped aperture, and into a main photocell 7. The beam reflected by the radiation divider 8 impinges a second photocell 9. A voltage divider 16 is connected to ground and to photocell 9, and has a tap which can be permanently adjusted to make the output voltage of photocell 9 equal to the output voltage of photocell 7 in the event that the focal spot of laser beam 1 is exactly located on the surface of record carrier 3. Approximate equality of the output voltage is obtained by suitable selection of the reflecting properties of the radiation divider 8.

The output voltages of photocells 7 and 9 are supplied to the inputs of a differential amplifier 17 which compares the output voltages and produces at its output a differential voltage which may be positive or negative, depending on the direction of displacement of record carrier 3 due to mechanical shocks, vibrations, or temperature variations.

The output voltage of differential amplifier 17 is supplied to an integrating amplifier 18 which has an output voltage up to ±100 volts. The output of amplifier 18 is connected to the input of variable control lens 10 whose power of refraction and focal length is varied corresponding to the variations of the amplified differential voltage produced by differential amplifier 17. Variations of the power of refraction of control lens 10 causes displacement of the focal spot of recording lens 2 in such a direction that the displacement of the record carrier 3 causing the differential voltage is compensated and the focal spot is maintained on the surface of the displaced record carrier 3. Depending on whether record carrier 3 was displaced toward the recording lens 2, or away from the same, the voltage applied to control lens 10 is positive or negative, and the power of refraction of control lens 10 is accordingly increased or reduced.

In one embodiment of the invention, the variation of the power of refraction of control lens 10 for a control voltage of 100 volts, has the following value:

$$\Delta f/f^2 = 2.6 \cdot 10^{13} \text{ cm.}^{11}$$

wherein $\Delta f$ is the variation of the focal length $f$.

The optical system including recording lens 2 and control lens 10 obtains a range of adjustment of $\pm 50\mu$ for a focal length of 16 mm. The recording system requires a focusing within 1 or $2\mu$ so that the arrangement of the invention substantially reduces the mechanical requirements of the recording system.

Figure 3:
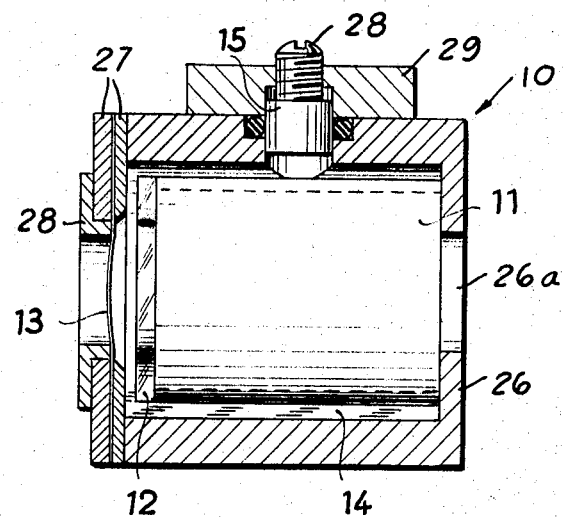
FIG. 3 is a sectional view illustrating a variable control lens including piezoelectric means responsive to a variable control voltage to vary the power of refraction of the control lens.

Referring now to FIG. 3 which illustrates a variable control lens 10. A cylindrical outer casing 26 has a central opening 26a in one end plate. The other open end of casing 26 is closed by clamping plates 27 between which a transparent flexible membrane 13 is clamped. The membrane 13 may consist of Hostaphan. Clamping plates 27 are held in position by a holding plate 28 secured to casing 26. Plates 27 and 28 have a central opening aligned with opening 26a.

A piezoceramic hollow cylinder 11 is located in casing 26 and has one end closed by a glass plate 12 of high optical quality which is adhesively secured to the rim of cylinder 11. The other end of cylinder 11 is adhesively secured to the end plate of casing 26. A transparent liquid 14 fills the space in casing 26 surrounding piezoceramic cylinder 11, and the space between glass plate 12 and flexible transparent membrane 13. An adjusting member 28 has a threaded part threaded into a bore in a member 29 secured to casing 26, and a piston part 15 movable in a corresponding bore in casing 26. When the position of piston 15 is adjusted, the pressure of the liquid in casing 26 is increased or reduced. If the pressure is increased, the free central part of the flexible resilient membrane 13 bulges outwardly and if the pressure is reduced, the curvature of member 13 is flattened, so that the power of refraction of control lens 10 is varied. The adjustment by means of piston 15 is not an object of the present invention and is used for permanently adjusting control lens 10.

In accordance with the invention, the hollow cylindrical piezoceramic cylinder 11 includes an inner and an outer cylindrical wall which are connected to electrodes receiving the variable voltage from amplifiers 17 and 18, as described with reference to FIG. 1. When a voltage is applied to the piezoceramic cylinder 11, it either increases its diameter and length, or reduces the same, depending on whether the applied voltage is positive or negative, and the expansion and contraction depend on the magnitude of the applied voltage which, as explained above, depends on the displacement of record carrier 3 out of the focal plane of the lens system 2, 10. The beam of light 1 passes through the central openings in plates 27, 28, the central portion of membrane 13, the glass plate 12, the interior of the piezoelectric means 11, and central opening 26a in casing 26. The variation of the power of refraction of the transparent flexible membrane 13 is proportional to the applied voltage. The maximum frequency of the adjustment of control lens 10 is limited by the condition that no self-oscillations of the flexible membrane 13 should be excited. The piezoelectric control of the variable control lens 12, 13 has extremely low inertia due to the small mass of the movable central portion of membrane 13.

The cylinder lens 5 forms an elongated focal image of the light reflected in beam 1a which has approximately the width of the aperture slot of diaphragm 6, and is parallel to the same. The length of the aperture slot of diaphragm 6 corresponds substantially to the transverse extension of the control beam 1a. The width of the aperture slot 6a shown in FIG. 2 is only a fraction of its length and corresponds to the sharpness and definition of the focal image formed by cylinder lens 5.

The use of a cylinder lens has the advantage that the focus can be moved in one direction perpendicular to the beam, as may be required for an automatic following movement of the focus, without disturbing the generation of the control voltage for the automatic focusing.

When the focal spot of the lens system 10, 2 is located in the plane of the record carrier, the aperture slot 6a is positioned in such a manner in relation to the elongated focal image of cylinder lens 5 that in the normal position of the focus of the lens system 10, 2 on record carrier 3, the output voltage of photocell 7 is constant, and equal to the output voltage of photocell 9, if the same and the radiation divider 8 are provided. When the elongated focal image of cylinder lens 5 is displaced due to a relative displacement between record carrier 3 and the focal spot of lens system 10, 2, the photocurrent of photocell 7 is varied in a positive or negative sense. This result is obtained by positioning the diaphragm 6 and cylinder lens 5 so that the elongated focal image produced by cylinder lens 5 is in the proximity of the aperture slot 6a of diaphragm 6 over the entire range of radiation, but does not coincide with the same, as shown in FIG. 2 where the diaphragm 6 is shown to be spaced from the focal plane 5a of cylinder lens 5.

Figure 2:
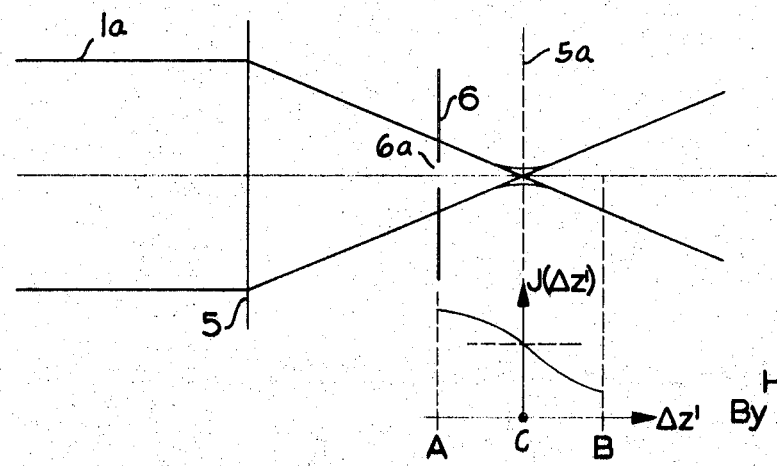
FIG. 2 is a schematic view illustrating a detail of the control means of FIG. 1, and includes a diagram illustrating the variation of the intensity of the reflected light projected onto the diaphragm.

FIG. 2 shows the path of the rays of control beam 1a focused by cylinder lens 5 when the focal plane of lens system 10, 2 coincides with the recording surface of record carrier 3. FIG. 1 shows in broken lines a displaced position of record carrier 3 in which the same is spaced a distance $\Delta z$ from the normal position. The diagrammatic part of FIG. 2 shows a positive or negative displacement $\Delta z'$ of the focal plane of cylinder lens 5 out of the normal position C to the extreme positions A and B. When $\Delta z$ is zero, $\Delta z'$ is also zero. When the record carrier 3 moves through the range of displacement $\pm \Delta z$, the elongated focal image formed by cylinder lens 5 moves within the ranges $\pm \Delta z'$ between the points A and B. Aperture slot 6a is at the end of the range limit A, and the intensity $J(\Delta z')$ conforms to the graph shown in the lower portion of FIG. 2, and is reduced towards the end of the range B. In relation to the normal focusing position in which $\Delta z$ is equal to zero, the intensity variations are positive or negative, corresponding to opposite displacements of record carrier 3 out of its normal position located in the focal plane of the unadjusted lens system 10, 2.

Due to the varying amounts of radiation entering photocell 7 through aperture slot 6a, the output voltage of photocell 7 varies in a positive or negative sense in accordance with displacement of record carrier 3 in opposite directions out of its normal position. Radiation divider 8 and photocell 9 may be omitted, and the varying output voltage of photocell 7 directly supplied to the terminals of the piezoceramic cylinder 11 of control lens 10 so that the position of the focal spot produced by the lens system 10, 2 is adjusted to the displaced position of record carrier 3. Control lens 10 is adjusted by the output voltage of photocell 7, or by the differential voltage produced in differential amplifier 17 so that the focal length of the lens system 10, 2 is increased or reduced and the focal spot of the lens system 10, 2 follows the displaced record carrier 3 the distance $\pm \Delta z$ to the displaced position of the same.

It is also possible to omit control lens 10, and to return record carrier 3 from its displaced position to its normal position located in the focal plane of recording lens 2. This is accomplished by electromechanical means controlled by the differential voltage produced by differential amplifier 17.

The radiation divider 8 and the second photocell 9, together with the differential amplifier 17, are provided in order to make the regulating arrangement independent of undesired variations of the laser beam 1. Instead of comparing the output voltage of photocell 7 with a constant voltage, the same is compared with the output voltage of photocell 9 which varies in accordance with intensity fluctuations of the main beam 1 and control beam 1a.

It will be understood that each of the elements described above, or two or more together, may also find a useful application in other types of apparatus for maintaining a recording radiation spot on a record carrier irrespective of displacements of the same, differing from the types described above.

While the invention has been illustrated and described as embodied in control means for varying the focal length of a lens system including an adjustable control lens operated by piezoelectric means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Apparatus for maintaining a recording radiation spot on a moving flexible record carrier, comprising, in combination, means for projecting a main beam of radiation; first lens means for projecting the radiation of said main beam at a focal point located in a first focal plane; flexible record carrier located in said focal plane so that the radiation is focused at said focal point as a focal spot; means for continuously moving said flexible record carrier relative to said lens means in one direction in said first focal plane so that said spot makes a recording on said record carrier, said moving record carrier being subject to undesired displacement transverse to said focal plane and out of the same; control means including a radiation divider located in said main beam and forming a control beam of radiation reflected from said spot on said record carrier, a second lens means in said control beam forming a focal image of said reflected spot in a second focal plane, said focal image moving transversely to said second focal plane when said control beam varies due to transverse displacement of said record carrier out of said first focal plane; a stationary diaphragm in said control beam having an aperture, and a photocell receiving from said focal image through said aperture an amount of radiation depending on the relative position of said focal image and said aperture, and varying due to displacement of said focal image caused by transverse displacement of said record carrier out of said first focal plane, said photocell producing a variable voltage depending on the amount of radiation received by said record carrier and on the transverse displacement of the same; and electric-adjusting means controlled by said record carrier for continuously adjusting transversely to said first focal plane the focal length of said first lens means so that said focal point remains located on said record carrier irrespective of transverse displacement of the same.

2. Apparatus as claimed in claim 1, wherein said adjusting means comprise a radiation divider in one of said beams, a second photocell receiving radiation from said radiation divider and producing an output voltage equal to said variable voltage when said focal point is located on said record carrier, means for comparing said output voltage with said variable voltage and producing a differential voltage, and means controlled by said differential voltage to adjust the relative position of said focal point and record carrier whereby variations of the reflected radiation and fluctuations of the intensity of the radiation of said main beam are compensated.

3. Apparatus as claimed in claim 1, wherein said adjusting means comprise a control lens whose refractive power is adjustable, and which is located in said main beam, and means responsive to said variable voltage for adjusting the refractive power of said control lens so that said focal point is maintained on said record carrier.

4. Apparatus as claimed in claim 1, wherein said adjusting means comprise a radiation divider in said control beam, a second photocell receiving radiation from said radiation divider and producing an output voltage equal to said variable voltage when said focal point is located on said record carrier, means for comparing said output voltage with said variable voltage and producing a differential voltage, amplifier means for amplifying said differential voltage, and control lens means located in said mean beam and responsive to said amplified differential voltage to vary the refractive power thereof so that the focal point of said first lens means is maintained on said record carrier.

5. Apparatus as claimed in claim 1, wherein said second lens means includes a cylinder lens; wherein said aperture of said diaphragm is a slot having a predetermined width corresponding to the width of the focal image of said cylinder lens and to the relative displacement between said focal point and said record carrier, said diaphragm and slot being located between said cylinder lens and said photocell spaced a predetermined distance in the direction of said control beam from said second focal plane when said record carrier is in its normal position.

6. Apparatus as claimed in claim 5, wherein said stationary diaphragm is located between said cylinder lens and said second focal plane spaced a distance from the latter corresponding to the maximum transverse displacement of said record carrier relative to said first lens means.

7. Apparatus as claimed in claim 5, wherein said adjusting means comprise a radiation divider in said control beam, a second photocell receiving radiation from said second radiation divider and producing an output voltage equal to said variable voltage when said focal point is located on said record carrier, means for comparing said output voltage with said variable voltage and producing a differential voltage, amplifier means for amplifying said differential voltage, and control lens means located in said main beam and responsive to said amplified differential voltage to vary the refractive power thereof so that the focal point of said first lens means is maintained on said record carrier.

8. Apparatus as claimed in claim 1 wherein said stationary diaphragm and said aperture are located between said second lens means and said photocell spaced from the latter a predetermined distance proportionate to the maximum transverse displacement of said record carrier means in one direction relative to said first lens means.

9. Apparatus as claimed in claim 1, wherein said adjusting means comprise a control lens means including a flexible transparent membrane, and adjusting means responsive to said variable voltage to adjust the power of refraction of said control lens means, said adjusting means including a chamber bounded by said membrane, fluid in said chamber, and expansible and contractable piezoelectric means in said chamber electrically connected with said photocell and being expanded and contracted by said variable voltage to produce pressure is said fluid for displacing said membrane whereby the power of refraction of said control lens means is adjusted.

10. Apparatus as claimed in claim 9, wherein said piezoelectric means include inner and outer tubular ceramic members; and wherein said control lens means comprises a glass plate closing one end of said tubular ceramic members and being located opposite said membrane to form with the same and with fluid therebetween an adjustable lens.

11. An adjustable electrically controlled lens comprising, in combination, casing means having an opening; a flexible membrane closing said opening; a transparent means in said casing means located opposite said membrane; piezoelectric means in said casing means supporting said transparent means and forming with the same a closed chamber in said casing means; and fluid in one part of said closed chamber located between said membrane and said transparent means and forming with the same an adjustable lens so that when a variable voltage is applied to said piezoelectric means and the same expand or contract, the fluid between said membrane and said transparent means is displaced and deforms said membrane whereby the power of refraction of said adjustable lens is adjusted depending on the applied voltage.

12. An adjustable lens as claimed in claim 11, wherein said casing means is substantially tubular and has openings at the ends thereof, one of said openings being closed by said membrane; wherein said piezoelectric means are tubular and surround the other opening; and wherein said transparent means is a transparent plate secured to the end of said tubular piezoelectric means opposite said one opening and said membrane.

13. An adjustable lens as claimed in claim 12, wherein said piezoelectric means comprises inner and outer tubular ceramic members respectively connected to opposite poles of said voltage.

14. An adjustable lens as claimed in claim 12, wherein said tubular piezoelectric means is located within said tubular casing radially spaced from the same and forming another part of said closed chamber communicating through a circular gap with said one part of said closed chamber.

15. An adjustable lens as claimed in claim 11, wherein said casing means has a bore communicating with said chamber; and comprising piston means in said bore adjustable for setting a predetermined normal pressure in said chamber so that said flexible membrane has a normal position in which said adjustable lens has a normal power of refraction which is varied by variations of the applied voltage causing expansion and contraction of said piezoelectric means, and bulging and flattening of said flexible membrane.